(12) United States Patent
Kagami

(10) Patent No.: US 7,995,253 B2
(45) Date of Patent: Aug. 9, 2011

(54) IMAGE READING DEVICE AND CONTROL METHOD THEREOF

(75) Inventor: Yoshinobu Kagami, Kanagawa (JP)

(73) Assignee: Ricoh Company Limited, Tokyo (JP)

( * ) Notice: Subject to any disclaimer, the term of this patent is extended or adjusted under 35 U.S.C. 154(b) by 685 days.

(21) Appl. No.: 12/041,848

(22) Filed: Mar. 4, 2008

(65) Prior Publication Data

US 2008/0225355 A1    Sep. 18, 2008

(30) Foreign Application Priority Data

Mar. 13, 2007    (JP) .................. 2007-062907

(51) Int. Cl.
*H04N 1/04* (2006.01)
*H04N 1/38* (2006.01)
*H04N 1/40* (2006.01)

(52) U.S. Cl. ........ 358/496; 358/486; 358/488; 358/474; 358/463; 358/464; 358/465; 358/497; 358/406

(58) Field of Classification Search .......... 358/486, 358/488, 463, 464, 496, 498, 406, 504, 465, 358/497; 382/275, 318; 399/361, 371, 379, 399/380
See application file for complete search history.

(56) References Cited

U.S. PATENT DOCUMENTS

| | | | |
|---|---|---|---|
| 6,393,161 B1 * | 5/2002 | Stevenson et al. | 382/275 |
| 6,522,431 B1 * | 2/2003 | Pitts et al. | 358/474 |
| 6,563,938 B1 * | 5/2003 | Harada | 382/108 |

FOREIGN PATENT DOCUMENTS

| | | |
|---|---|---|
| JP | 2000-287031 | 10/2000 |
| JP | 2001-85722 | 3/2001 |
| JP | 2001-333253 | 11/2001 |
| JP | 2002-185705 | 6/2002 |
| JP | 2002-185721 | 6/2002 |
| JP | 2002-185723 | 6/2002 |
| JP | 2002-251605 | 9/2002 |
| JP | 2002-320077 | 10/2002 |
| JP | 2002-330268 | 11/2002 |
| JP | 2002-354262 | 12/2002 |
| JP | 2003-8874 | 1/2003 |
| JP | 2003-078722 | 3/2003 |
| JP | 3667238 | 4/2005 |

OTHER PUBLICATIONS

Office Action dated Mar. 29, 2011, Japanese Application No. 2007-062907, filed Mar. 13, 2007. pp. 1-2.

* cited by examiner

*Primary Examiner* — Cheukfan Lee
(74) *Attorney, Agent, or Firm* — Oblon, Spivak, McClelland, Maier & Neustadt, L.L.P.

(57) ABSTRACT

An image reading device feeds a document original along a sub-scanning direction over an exposure glass. A moving unit moves to and fro in the sub-scanning direction over the exposure glass thereby causing an image reading position on the exposure glass to move. A line image sensor reads one line of an image of the document original at the image reading position in a main scanning direction, while the moving unit is moving, thereby obtaining image. A dirt determining unit determines that there is dirt on the exposure glass when a straight line appears in the main scanning direction in the image data.

4 Claims, 10 Drawing Sheets

| | READING WIDTH [mm] | IMAGE READING MAGNIFICATION [%] | | | |
|---|---|---|---|---|---|
| SIZE | | 50 | 100 | 150 | 200 |
| A5 PORTRAIT | 105.0 | 4.00 | 2.00 | 1.33 | 1.00 |
| A5 LANDSCAPE | 148.5 | 5.66 | 2.83 | 1.89 | 1.41 |
| A4 PORTRAIT | 210.0 | 8.00 | 4.00 | 2.67 | 2.00 |
| A4 LANDSCAPE | 297.0 | 11.31 | 5.66 | 3.77 | 2.83 |
| A3 PORTRAIT | 420.0 | 16.00 | 8.00 | 5.33 | 4.00 |

(CARRIAGE VELOCITY [mm/sec])

FIG. 9B

| | READING WIDTH [mm] | IMAGE READING MAGNIFICATION [%] | | | |
|---|---|---|---|---|---|
| SIZE | | 50 | 100 | 150 | 200 |
| A5 PORTRAIT | 105.0 | 2.50 | 2.50 | 2.50 | 2.50 |
| | | 10.00 | 10.00 | 10.00 | 10.00 |
| A5 LANDSCAPE | 148.5 | 3.54 | 3.54 | 3.54 | 3.54 |
| | | 14.14 | 14.14 | 14.14 | 14.14 |
| A4 PORTRAIT | 210.0 | 5.00 | 5.00 | 5.00 | 5.00 |
| | | 20.00 | 20.00 | 20.00 | 20.00 |
| A4 LANDSCAPE | 297.0 | 7.07 | 7.07 | 7.07 | 7.07 |
| | | 28.29 | 28.29 | 28.29 | 28.29 |
| A3 PORTRAIT | 420.0 | 10.00 | 10.00 | 10.00 | 10.00 |
| | | 40.00 | 40.00 | 40.00 | 40.00 |

(LENGTH OF VERTICAL LINE WHEN DIRT IS DETECTED:
UPPER LEVEL CORRESPONDS TO DIRT SIZE 0.05mm
AND LOWER LEVEL CORRESPONDS TO DIRT SIZE 0.2mm)

IMAGE READING DEVICE AND CONTROL METHOD THEREOF

CROSS-REFERENCE TO RELATED APPLICATIONS

The present application claims priority to and incorporates by reference the entire contents of Japanese priority document 2007-062907 filed in Japan on Mar. 13, 2007.

BACKGROUND OF THE INVENTION

1. Field of the Invention

The present invention relates to an image reading device including a line image sensor and a control method thereof.

2. Description of the Related Art

The existing so-called sheet-scan type (also known as sheet-through type) document readers feed a document original in the sub-scanning direction over an exposure glass. In addition they are equipped with a line image sensor that reads one line of an image in the main scanning direction at a reading position on the exposure glass. If dirt happens to be adhering to the exposure glass, the document reader reads the dirt as well, and the resulting image includes a vertical streak, which is the image of the dirt.

When such vertical steaks appear, the user has no option but to clean the exposure glass and repeat the reading operation.

Japanese Patent Application Laid-open No. 2002-251605, for example, discloses a technology to address the problem.

In this technology, to detect dirt on the reading surface, a conveyor belt is read without placing the document original on the exposure glass. Whether dirt is on the conveyor belt or on the reading surface is determined by whether or not the image of the streak is continuous in the sub-scanning direction.

If it is determined that dirt is present on the reading surface, the carriage is moved by a specific amount until no dirt is detected. However, if no position is dirt-free, it is determined that sheet-through reading is not possible, and a message indicating that there is presence of dirt is output.

However, the technology described above fails if dirt adheres to the reading surface when reading is underway. Further, the vertical streak on the conveyor belt is practically indistinguishable from the vertical streak caused by the dirt on the reading surface.

SUMMARY OF THE INVENTION

It is an object of the present invention to at least partially solve the problems in the conventional technology.

According to an aspect of the present invention, there is provided an image reading device that feeds a document original along a sub-scanning direction over an exposure glass. The image reading device includes a moving unit that moves to and fro in the sub-scanning direction over the exposure glass thereby causing an image reading position on the exposure glass to move; a line image sensor that reads one line of an image of the document original at the image reading position in a main scanning direction, while the moving unit is moving, thereby obtaining image data; and a dirt determining unit that determines, when a straight line appears in the main scanning direction in the image data, that there is dirt on the exposure glass.

According to another aspect of the present invention, there is provided a method of controlling an image reading device that feeds a document original along a sub-scanning direction over an exposure glass. The method includes moving a moving unit to and fro in the sub-scanning direction over the exposure glass thereby causing an image reading position on the exposure glass to move; reading by a line image sensor one line of an image of the document original at the image reading position in a main scanning direction, while the moving unit is moving, thereby obtaining image data; and determining, when a straight line appears in the main scanning direction in the image data, that there is dirt on the exposure glass.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described below with reference to the accompanying drawings.

Figure 1:
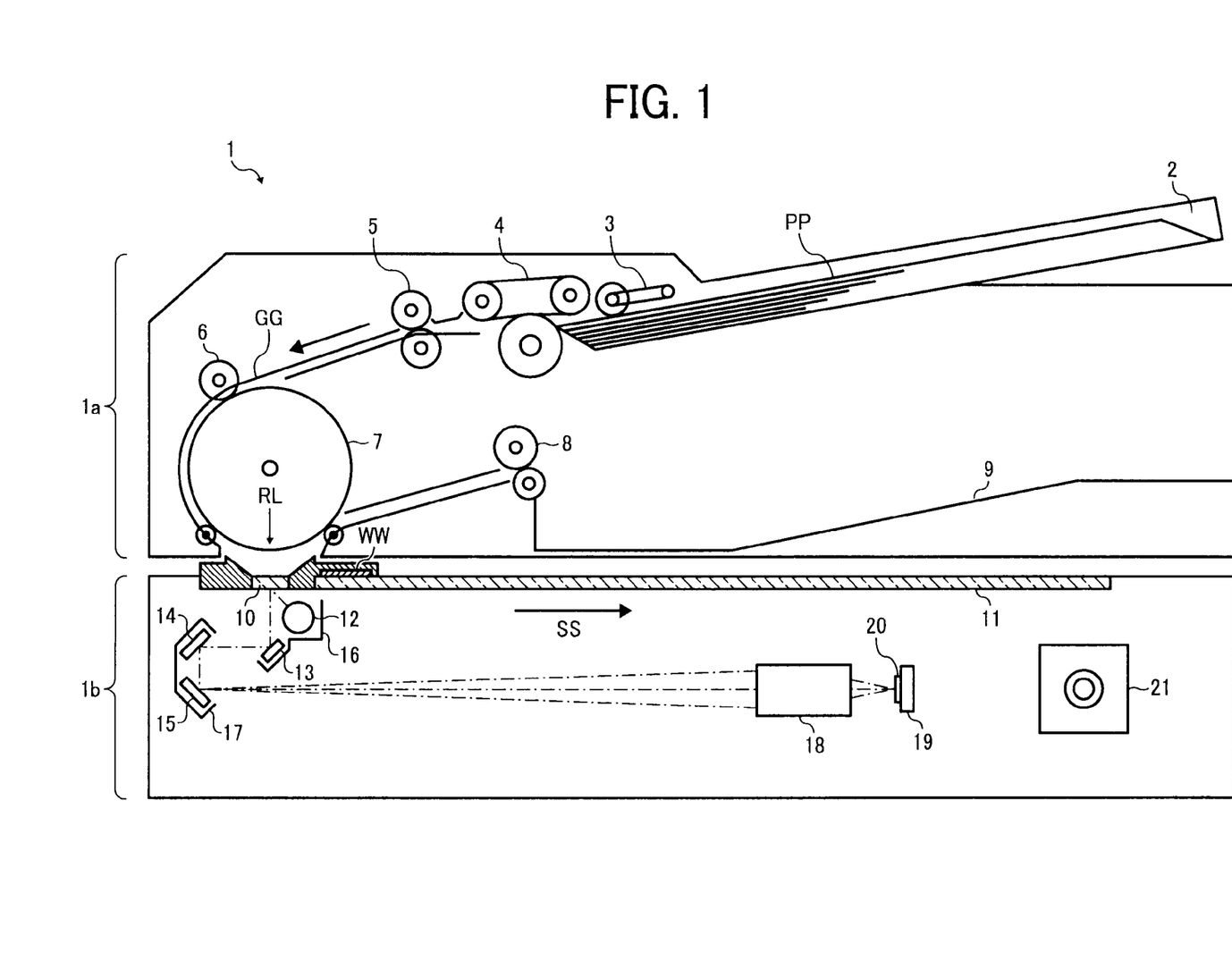
FIG. 1 is a schematic diagram of an image reading device according to an embodiment of the present invention.

FIG. 1 is a schematic diagram of an image reading device 1 according to an embodiment of the present invention. The image reading device 1 includes an automatic document feeder (ADF) unit 1a and an image reading unit 1b. The ADF unit 1a feeds document originals one by one from a document tray 2 to a reading position RL. The image reading unit 1b reads one line of the document original at the reading position RL, and is equipped with two types of document reading functions, namely, sheet-scan type document reading function and book-scan type document reading function. The present invention principally relates the sheet-scan type document reading function. Hence, book-scan type document reading function is not described here.

In the ADF unit 1*a*, a pickup roller 3 takes the topmost documents from document originals PP stacked up on the document tray 2, conveys the documents to a separating unit 4, which separates the documents and conveys it one by one to a pair of first conveying rollers 5. The first conveying rollers 5 convey one sheet of document original at a time towards a document conveying direction through a guiding member GG.

The document original PP is then conveyed between a second conveying roller 6 and a conveying drum 7, coming in tight contact with the conveying drum 7, and is conveyed past the reading position RL to a pair of ejection rollers 8, and is finally ejected onto an ejection tray 9.

In the image reading unit 1*b* an exposure glass 10 of sheet-scan type is arranged opposed to the reading position RL. The exposure glass 10 has a dimension of 4 mm in a sub-scanning direction.

A book-scan type exposure glass 11 is arranged right of the exposure glass 10. A white reference board WW is provided for forming a white reference image for shading correction.

A lamp 12 illuminates the surface of the document original PP at the reading position RL. The light reflected back from the reading position is reflected in sequence by a first mirror 13, a second mirror 14, and a third mirror 15, is passed through a lens 18 to be condensed, and illuminates a charge-coupled device (CCD) line-image sensor 20 set on a base 19.

The lamp 12 and the first mirror 13 are mounted on a first carriage 16 and are shifted to and fro in a sub-scanning direction SS. Similarly, the second mirror 14 and the third mirror 15 are mounted on a second carriage 17 and are shifted to and fro in the sub-scanning direction SS. The second carriage 17 is shifted at half the velocity of the first carriage 16 to maintain an optical path length from the exposure glass 10 to the CCD line-image sensor 20.

A scanner motor 21 drives the first carriage 16 and the second carriage 17.

Figure 2:
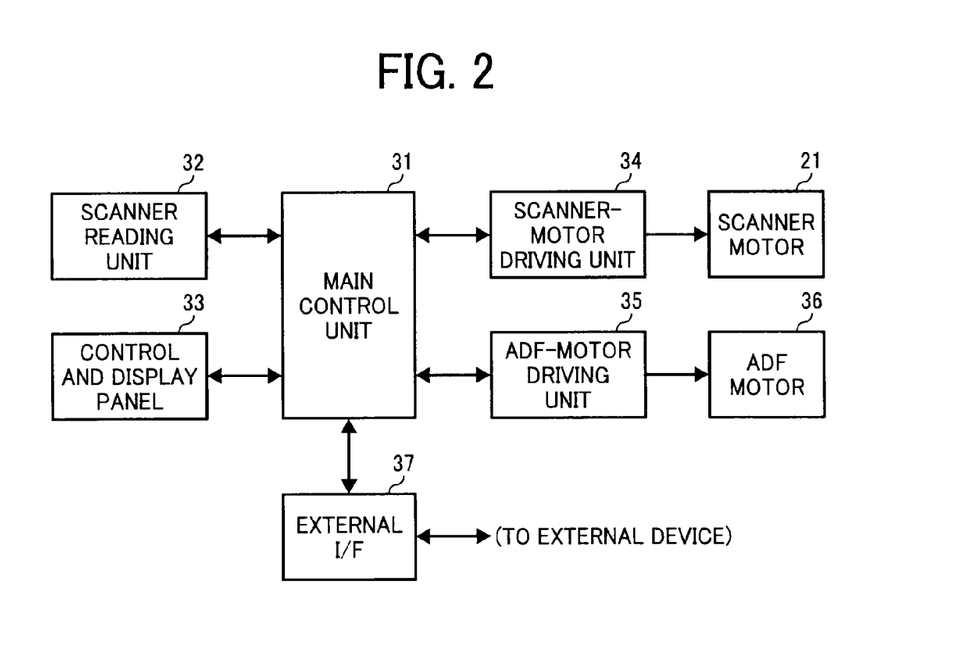
FIG. 2 is a block diagram of a control system of the image reading device according to the embodiment.

FIG. 2 is a block diagram of a control system of the image reading device 1 according to the embodiment. For reasons mentioned earlier, only the sheet-scan type document reading function is shown in FIG. 2.

A main control unit 31 controls the functioning of all the parts of the image reading device 1. A scanner reading unit 32 reads the CCD line-image sensor 20. A control and display panel 33 includes keys to enable the user to operate the image reading device 1 and a display device for providing information to the user by way of displaying.

A scanner-motor driving unit 34 controls the way the scanner motor 21 is driven. An ADF-motor driving unit 35 controls the way an ADF motor 36 (not shown in FIG. 1) is driven. The ADF motor 36 drives each of the conveying units of the ADF unit 1*a*. An external interface (I/F) 37 connects the image reading device 1 to an external device.

Figure 3:
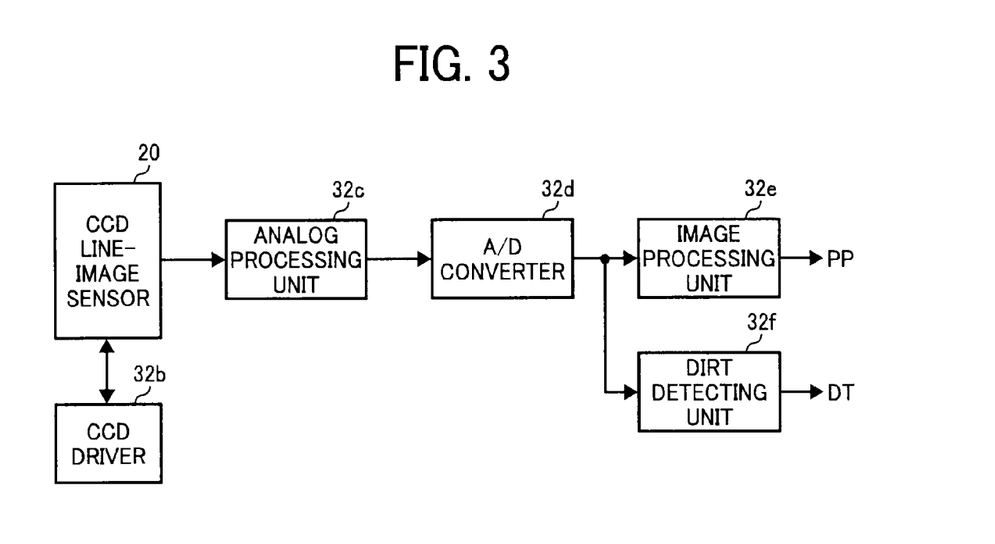
FIG. 3 is a schematic diagram of a scanner reading unit.

FIG. 3 is a schematic diagram of the scanner reading unit 32.

A CCD driver 32*b* controls the reading operation of the CCD line-image sensor 20. Read signals read by the CCD line-image sensor 20 are applied to an analog processing unit 32*c*.

The analog processing unit 32*c* performs a predetermined analog process. The outcome of the analog process is applied to an analog-to-digital converter 32*d*. The analog-to-digital converter 32*d* performs pixel-by-pixel sampling of the read signal of one line output by the analog processing unit 32*c* and converts the analog signal of each pixel into a digital signal of a corresponding digit, and applies the resulting digital signal to an image processing unit 32*e* and a dirt detecting unit 32*f*.

The image processing unit 32*e* performs a predetermined imaging process based on the digital signal applied by the analog-to-digital converter 32*d*, and outputs an image reading digital signal PP to a device at the next level. The dirt detecting unit 32*f* determines whether the read image data includes image caused by dirt based on the digital signal received from the analog-to-digital converter 32*d*, and outputs a detection signal DT to the main control unit 31.

Figure 4:
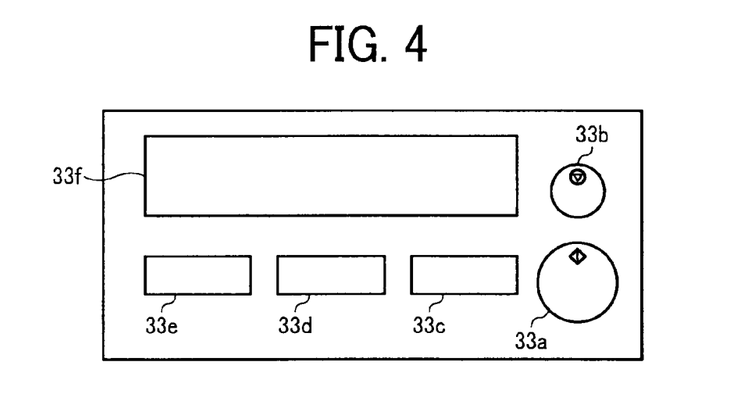
FIG. 4 is a schematic diagram of a control and display panel.

FIG. 4 is a schematic diagram of the control and display panel 33.

The control and display panel 33 includes a start key 33*a*, a stop key 33*b*, mode keys 33*c* to 33*e*, and a liquid-crystal display unit 33*f*. The start key 33*a* is an operation input key for commencing the document reading operation. The stop key 33*b* is an operation input key for stopping the document reading operation. The mode keys 33*c* to 33*e* are setting input keys for selecting reading modes. The liquid-crystal display unit 33*f* displays various data (such as error warning) for the benefit of the user.

Figure 5:
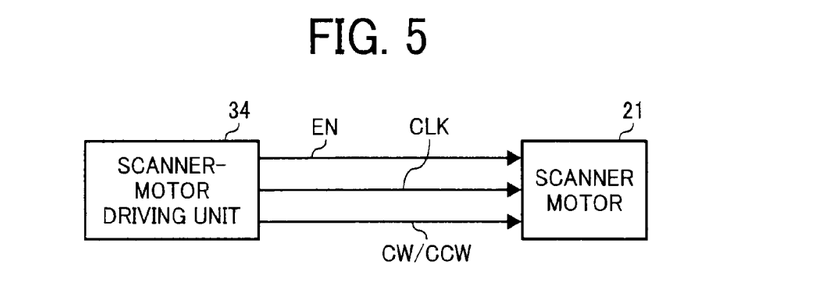
FIG. 5 is a block diagram of an aspect of how a scanner-motor driving unit drives a scanner motor.

FIG. 5 is a block diagram of an aspect of how the scanner-motor driving unit 34 drives the scanner motor 21.

The scanner motor 21 is a stepping motor. Accordingly, the scanner-motor driving unit 34 outputs to the scanner motor 21 an enable signal EN (see (a) in FIG. 6, non-logical) indicating a drive instruction, a clock signal CLK (see (b) in FIG. 6) for driving the scanner motor 21, and a control signal CW/CCW (see (c) in FIG. 6) for controlling a rotation direction.

Figure 6:
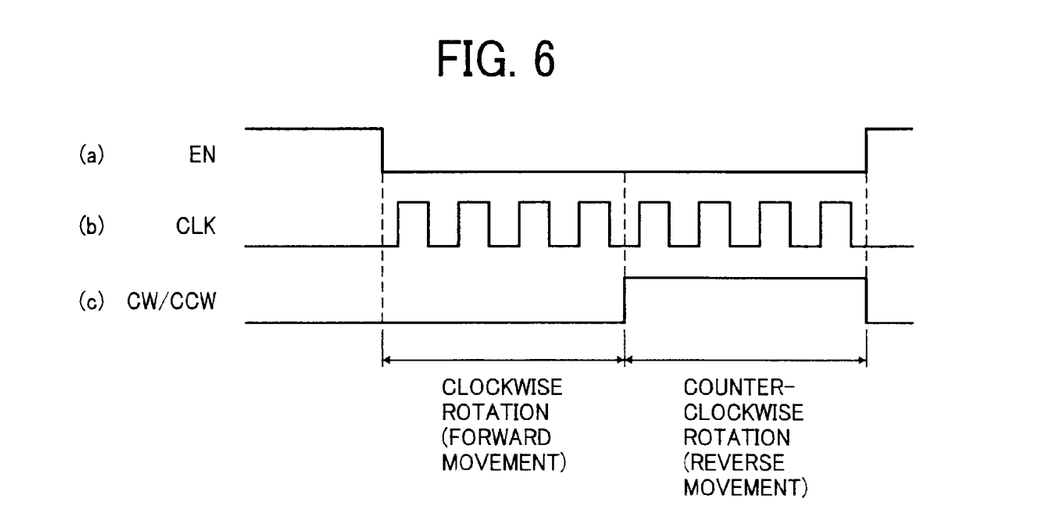
FIG. 6 is a schematic diagram of a plurality of signals applied to the scanner motor driving unit.

If the control signal CW/CCW is in a logical state L when the enable signal EN is in a logical state L, the scanner motor 21 is driven step-wise in a clockwise direction, synchronous with the clock signal CLK. The clockwise rotation of the scanner motor 21 moves the first carriage 16 and the second carriage 17 along the sub-scanning direction SS.

If the control signal CW/CCW is in a logical state H when the enable signal EN is in a logical state L, the scanner motor 21 is driven step-wise in a counter-clockwise direction, synchronous with the clock signal CLK. The counter-clockwise rotation of the scanner motor 21 moves the first carriage 16 and the second carriage 17 along the sub-scanning direction SS in the opposite direction.

Figure 7A:
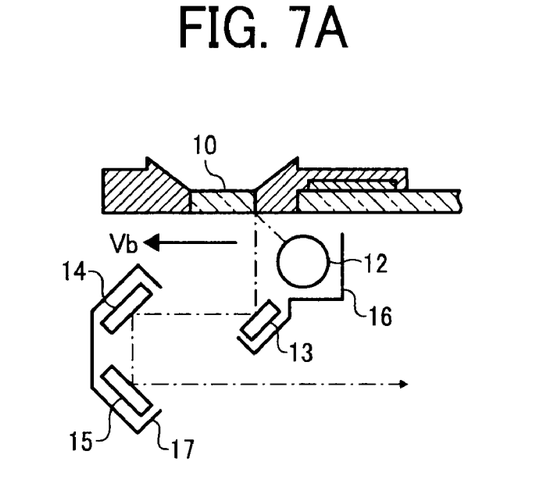
FIGS. 7A and 7B are schematic diagrams for explaining movement of a reading position.
Figure 7B:
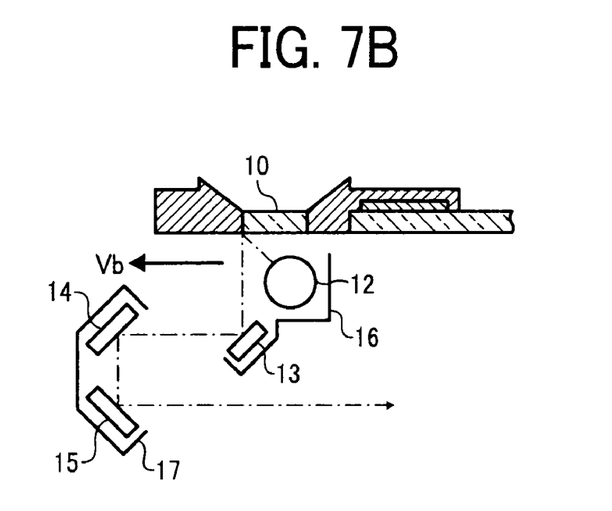

As shown in FIGS. 7A and 7B, the reading operation of the CCD line-image sensor 20 is performed while shifting the reading position RL illuminated by the lamp 12 from a downstream end (hereinafter, "right end" or "reference position") of the exposure glass 10 along sub-scanning direction SS to an upstream end (hereinafter, "left end" or "terminal position") of the exposure glass 10 along the sub-scanning direction SS at a velocity Vb. The shifting of the reading position RL is in effect accomplished by shifting the first carriage 16 and the second carriage 17. Hence, shifting and the reading position can also be called shifting of the carriages.

Figure 8A:
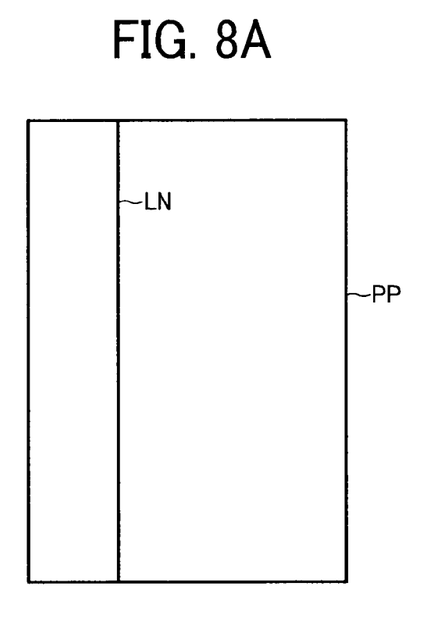
FIGS. 8A and 8B are schematic diagrams for explaining formation of vertical streaks.

If the reading position is fixed as in the conventional device, the dirt adhering to the exposure glass 10 is read as a vertical streak LN as shown in FIG. 8A when a pageful is read.

Figure 8B:
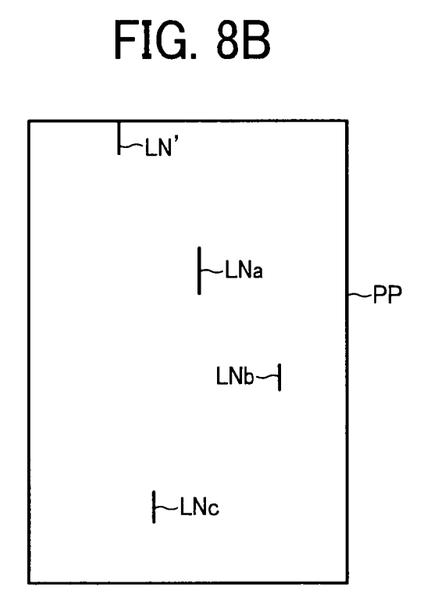

On the other hand, when the reading position is shifted from the right end to the left end, the vertical streak gets shorter, as shown in FIG. 8B. If dirt is present at the reading position, a vertical streak LN' is produced. As the reading position recedes from the dirt, the vertical streak LN' is no longer formed.

If dirt is present at several places on the exposure glass 10, a vertical streak appears every time the reading position passes by a dirty spot. Vertical streaks LNa, LNb, and LNc in FIG. 8B indicate dirty spots the reading position moves through.

In other words, in the present embodiment, dirt produces a much shorter vertical streak LN' as against the vertical streak LN that extends the entire length of the page in the conventional device. Therefore, there is significant reduction in image degradation. In the embodiment, although several vertical streaks (short) are produced if there are several dirt spots, overall, image degradation is still much less compared to the conventional device.

Detection of dirt on the exposure glass 10 is described below.

The position of the vertical streak caused by dirt adhering to the exposure glass 10 in the embodiment in the main scanning direction is unvarying. On the other hand, the position of a vertical line (line parallel to the sub-scanning direction or perpendicular to the main scanning direction) in the document original PP varies mildly in the main scanning direction most of the time. There are instances when the position of the vertical line in the document original PP varies significantly in the main scanning direction.

The reason for the variation of the position of the vertical line in the document original PP even if very precise control is exerted by the ADF unit 1a is because of skew occurring in the document original PP when transiting the exposure glass 10 and the edge of the document original PP not being perfectly parallel to the sub-scanning direction.

Thus, in the present embodiment, an unambiguous detection of dirt on the exposure glass 10 can be made.

Conditions under which dirt detection takes place are described below. These conditions are related to the size of the document original PP.

The velocity at which the first carriage 16 (read line) is moved is described first.

Figure 9A:
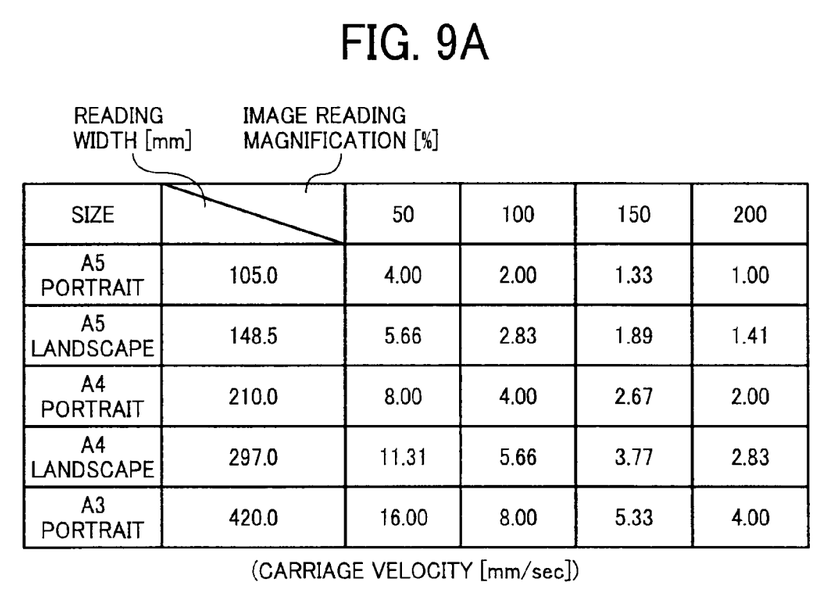
FIGS. 9A and 9B are tables for explaining the relation between a carriage velocity and length of the vertical streak appearing on an image when there is presence of dirt.

FIG. 9A is a table for explaining the relation between the document size of the document original PP, an image reading magnification, and the velocity of read line (carriage) (hereinafter, "carriage velocity").

The carriage velocity (in mm/sec) is determined by Equation 1 given below.

$$\text{Carriage velocity} = 4 \times 100/M \times 210/S \quad (1)$$

where M denotes the image reading magnification (%) and S denotes a reading size (mm). With the dimension of the exposure glass 10 in the sub-scanning direction being 4 mm, the carriage velocity for a document of A4 portrait size (reading width of 210 mm) read at actual size (100%) would be 4 mm/sec. A conveying velocity of the document original is 400 mm/sec.

Figure 9B:
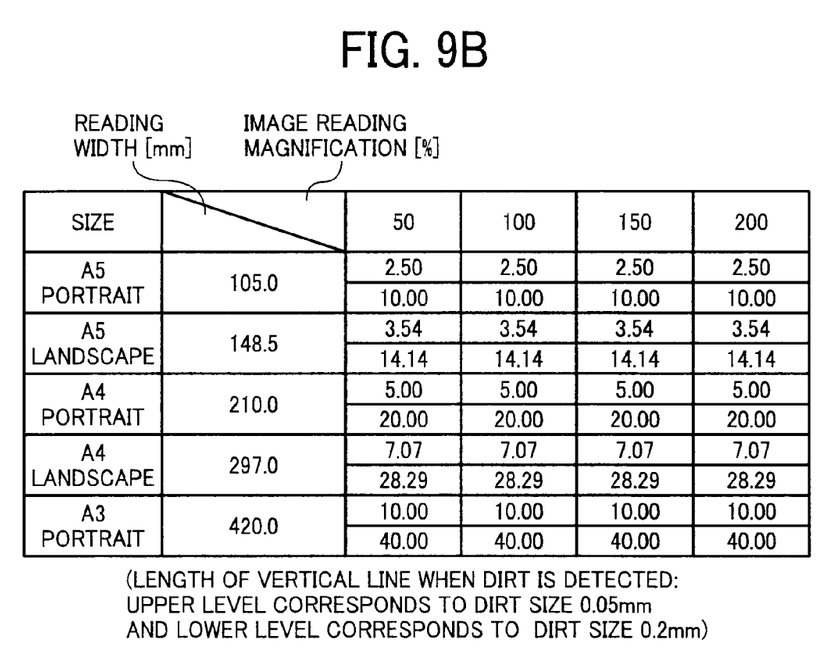

If we suppose that size of the dirt on the exposure glass 10 to be in the range of 0.05 mm to 0.2 mm, the length (in mm) of the vertical streak produced due to the dirt would vary with the carriage velocity, and can be determined by Equation 2 given below. FIG. 9B is a table for explaining the lengths of the vertical streak corresponding to the carriage velocities shown in FIG. 9A.

$$\text{Length of vertical streak} = 400 \times 100/M/(4 \times 100/M \times 210/S \times (\text{size of dirt}) \quad (2)$$

where M denotes the image reading magnification (%), S denotes the reading size (mm). As shown in FIG. 9B, these conditions, namely, the image reading magnification and the reading size, are the same as in FIG. 9A. It can be surmised from FIG. 9A that the length of the vertical streak is not affected by the image reading magnification but is varies with the reading size.

What happens when the reading position (carriage) is moving when the document original PP is being read is described below.

When the reading position moves to and fro from the right end and the left end of the exposure glass 10, the relative velocity of the document original PP and optical elements vary according to the movement velocity of the reading position. In the present embodiment, as the document original PP is conveyed from the left of the exposure glass 10 towards the right (see FIG. 1), when the reading position moves from the right end of the exposure glass 10 to the left end (hereinafter, "reverse direction"), the relative velocity increases by the movement velocity of the reading position (Relative velocity=(Conveying velocity of document original PP)+(Movement velocity of reading position). On the other hand, when the reading position moves from the left end of the exposure glass 10 to the right end (hereinafter, "process direction"), the relative velocity is reduced by the movement velocity of the reading position (Relative velocity=(Conveying velocity of document original PP)−(Movement velocity of reading position)).

When a reading cycle is set for the CCD line-image sensor 20, taking as reading operation reference a state when the reading position is fixed, the reading cycle will need to be adjusted according to the relative velocity of the document original PP and the optical elements. For example, if the relative velocity increases by 1%, the reading cycle would need to be reduced (or increased) by 1%, and similarly, if the relative velocity decreases by 1%, the reading cycle would need to be increased (or reduced) by 1%, so that a constant sampling distance (sampling width) of the image in the sub-scanning direction can be maintained by the CCD line-image sensor 20.

The feature of enabling reading cycle adjustment is provided to enhance user-friendliness of the image reading device 1 so that the user has the option of selecting the reading mode in which the image reading device 1 is to be operated, namely, with or without dirt detection.

The dimension of the dirt adhering to the exposure glass 10 does not vary in the sub-scanning direction. However, controlling the reading cycle of the CCD line-image sensor 20 produces different lengths of the vertical streak due to the dirt when the reading position moves in the reverse direction and when the reading position moves in the process direction.

Figure 10A:
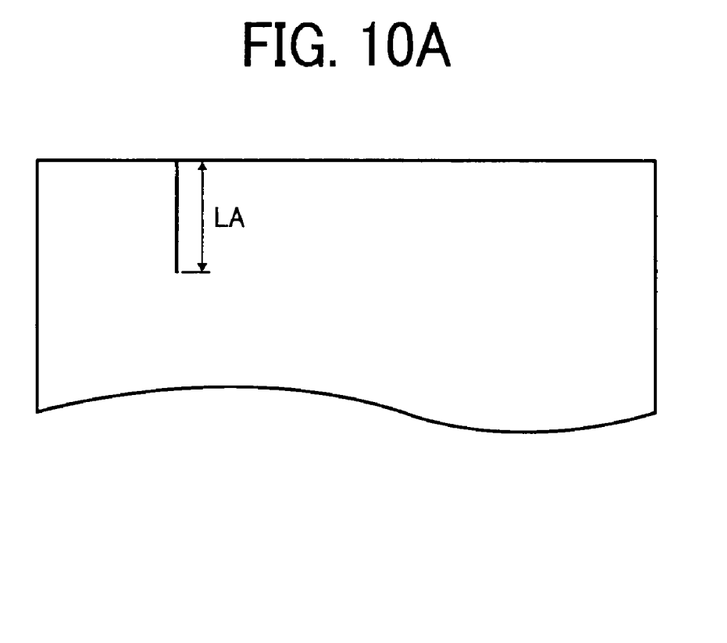
FIGS. 10A and 10B are schematic diagrams for explaining how the length of the vertical streak varies when reading is carried out in a direction opposite to a document conveying direction and when conveyed in a process direction.
Figure 10B:
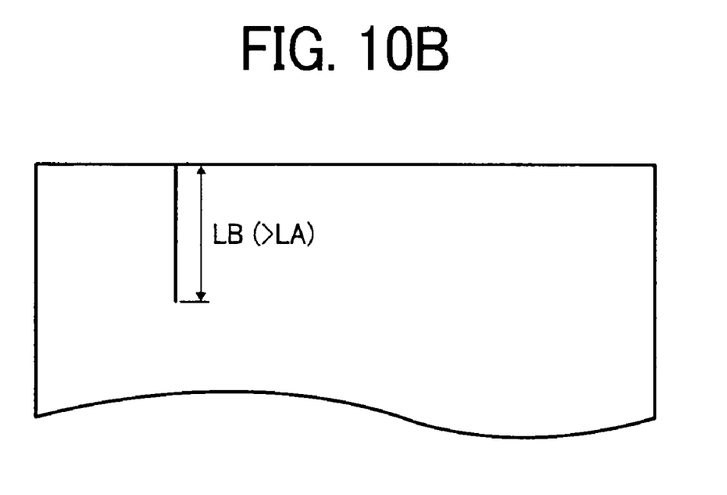

In other words, when the reading position moves in the reverse direction, a vertical streak of length LA shown in FIG. 10A is produced, whereas when the reading position moves in the process direction, a vertical streak of length LB (which is shorter than LA) is produced.

Thus, when a plurality of document originals PP are to be read, and the reading position moves in the reverse direction for the first document original PP and in the process direction for the second document, the vertical streak produced when reading the first document is longer than the vertical streak produced when reading the second document. Consequently, it can be surmised that the longer vertical streak is produced by the presence of dirt, and therefore, there is presence of dirt on the exposure glass 10.

When only one document PP is to be read, the reading position is moved in the reverse direction to perform a blank reading without placing the document original PP on the document tray 2 prior to the reading operation and then the document original PP is placed on the document tray 2 and read by moving the reading position in the process direction. When the vertical streaks produced in the two reading operations are compared, the vertical streak produced during blank reading will obviously be found to be longer than the vertical streak produced in the latter. Consequently, it can be surmised that the longer vertical streak is produced by the presence of dirt, and therefore, there is presence of dirt on the exposure glass 10.

If there is dirt on the exposure glass 10, and reading is performed by moving the reading position in the reverse direction as well as the process direction from the terminal position, the positions of vertical streaks that appear in the read image during the forward and reverse movement of the reading position will vary if the distance from the read commencement position to the dirt during the forward movement varies from the distance from the read commencement position to the dirt during the reverse movement.

Thus, if the positions of the vertical streaks in the read image, which are unvarying in the main-scanning direction, vary in the reverse movement of the reading position from the reference position and the forward movement of the reading position from the terminal position, it can be surmised that there is presence of dirt on the exposure glass 10.

As for how frequently dirt detection operation should be performed, it would be helpful to bear in mind that dirt of the size that can adversely affect image reading when adhered to a surface of the exposure glass 10 can often get conveyed when the document original PP is being conveyed.

Thus, if a document original warrants a high-precision reading, the user can select the reading mode with dirt detection. Otherwise, the user can select the reading mode without dirt detection.

It is preferable that the user be notified by a message if presence of dirt is detected in the reading mode with dirt detection. The message displayed should preferably urge the user to clean the exposure glass 10. If, as instructed by the message, the user cleans the exposure glass 10 and allows the reading operation to be performed once again, the resulting image is bound to be of high quality without the adverse effect caused by dirt.

It is also possible to enforce an image processing that erases the image data produced by dirt. However, if the image data due to dirt is not in an inter-image region (including margins) but is superposed on the actual image position, it would be necessary to implement a highly precise separation process to separate the actual image and the image data due to dirt or a process to obscure the dirt image.

Figure 11:
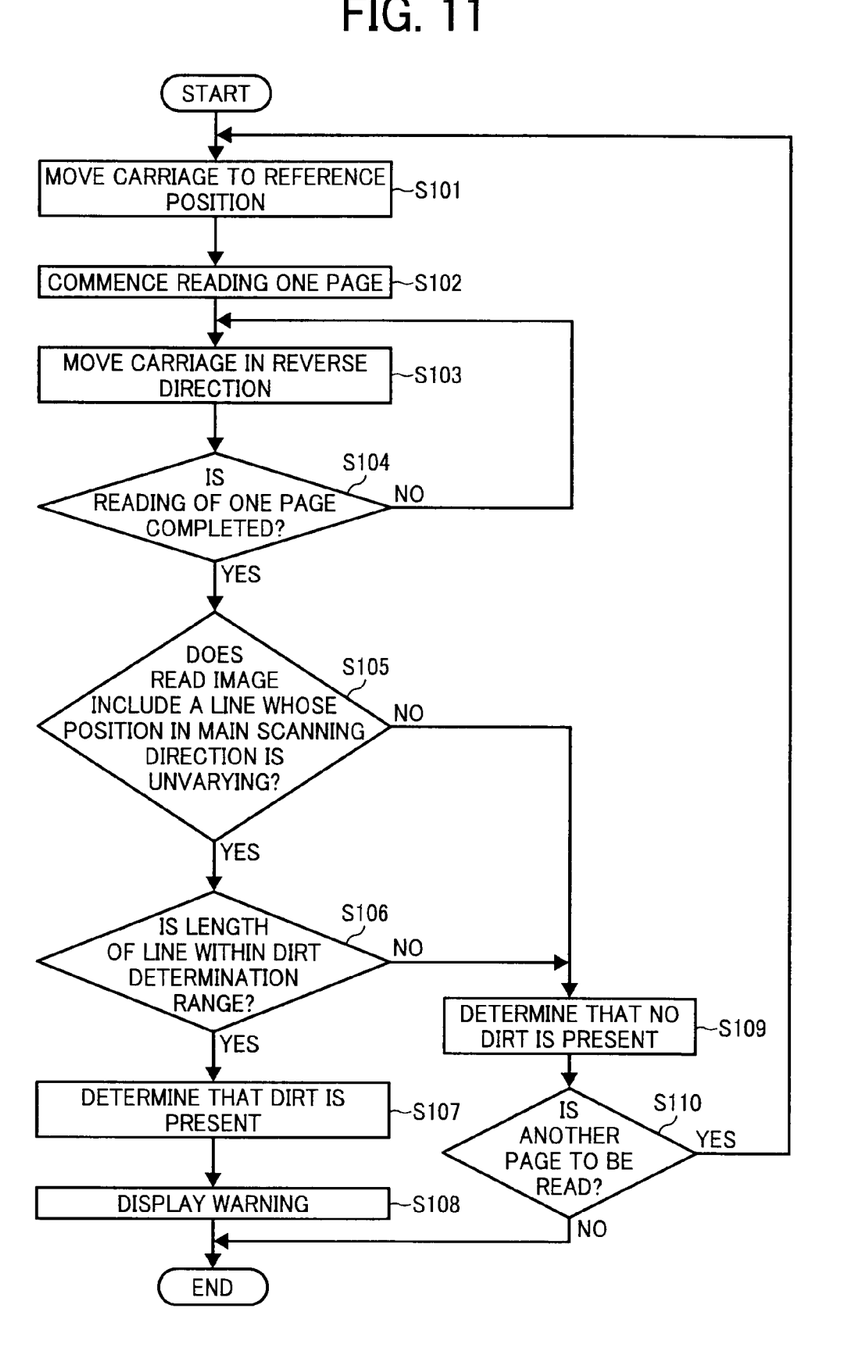
FIG. 11 is a flowchart of one example of main processes in a reading operation performed by the image reading device in a reading mode with dirt detection.

FIG. 11 is a flowchart of one example of main processes in the reading operation performed by the image reading device 1 in the reading mode with dirt detection.

The image reading device 1 first moves the carriage (reading position) to the reference position (step S101), and commences the reading of one page (step S102). The carriage is moved in the reverse direction at a velocity determined according to the size of the document original and the image reading magnification until the reading operation of the entire page is completed (step S103, and No at step S104).

Once the reading operation of the entire page is completed, and the outcome of decision at step S104 becomes positive, the image reading device 1 checks the read image data for presence of a vertical line whose position remains unvarying in the main scanning direction (step S105). If the outcome of decision at step S105 is positive, the image reading device 1 checks by applying the conditions described above whether the length of the vertical line falls in the dirt determination range (step S106).

If the outcome of decision at step S106 is positive, the image reading device 1 determines that there is presence of dirt (step S107), and displays a warning on the control and display panel 33 (step S108). If the outcome of decision at step S106 is negative, the image reading device 1 determines that there no presence of dirt (step S109). The image reading device 1 then checks whether there is another page to be read (step S110). If the outcome of decision at step S110 is positive, the process control returns to step S101, and the image reading device 1 performs the reading operation of the next page. If the outcome of decision at step S110 is negative, the process control ends the reading operation.

Figure 12:
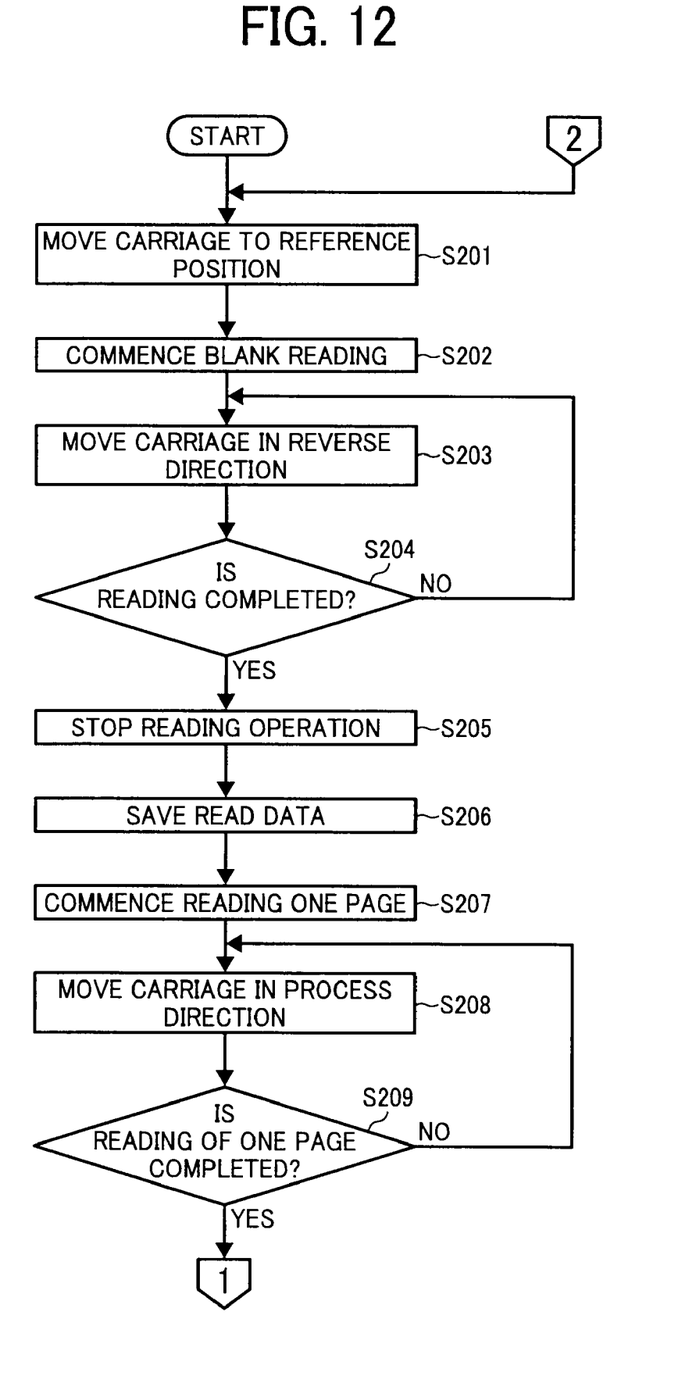
FIG. 12 is a flowchart of another example of main processes in the reading operation performed by the image reading device in the reading mode with dirt detection.
Figure 13:
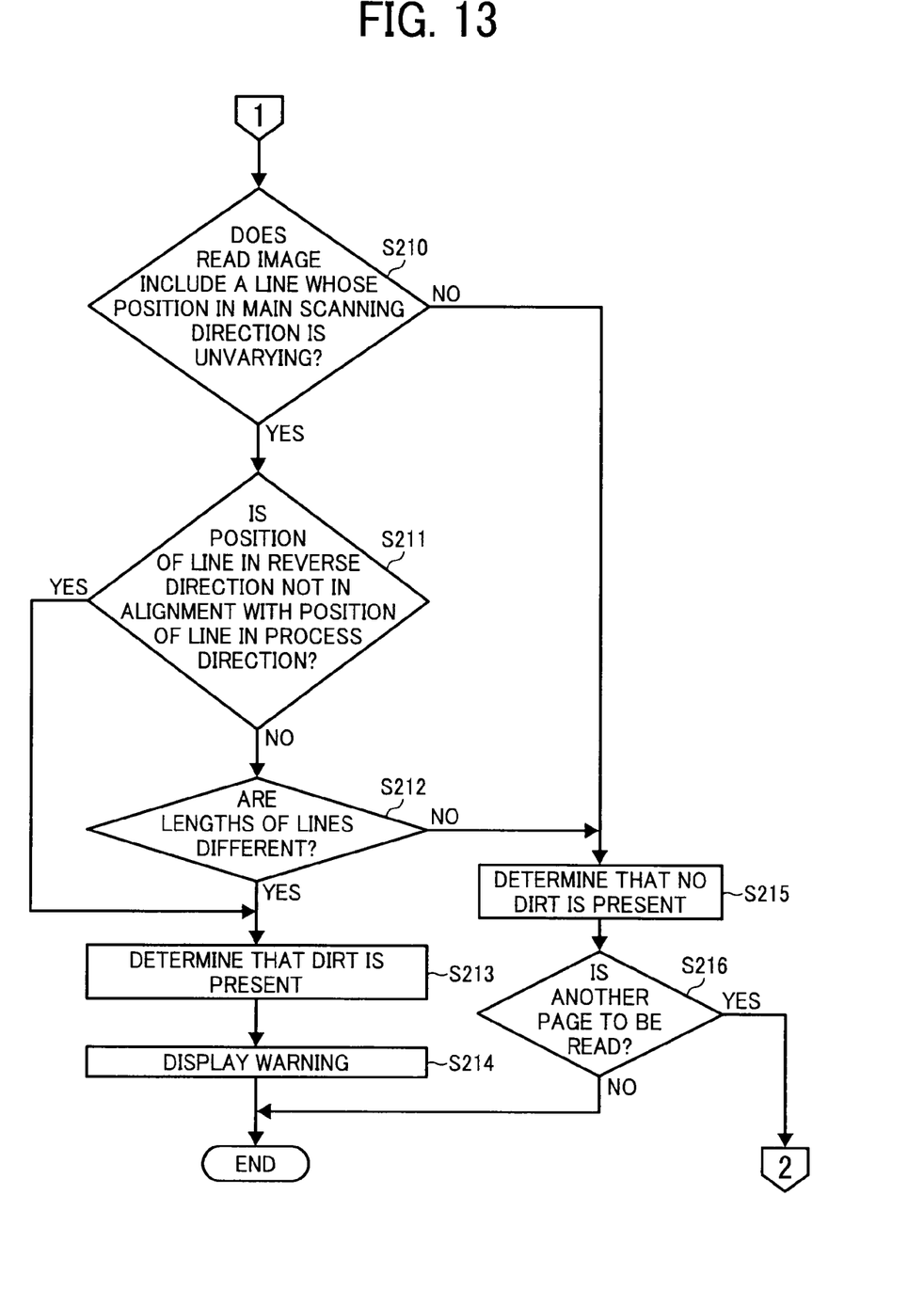
FIG. 13 is a continuation of the flowchart shown in FIG. 12.

FIGS. 12 and 13 are a flowchart of another example of main processes in the reading operation performed by the image reading device 1 in the reading mode with dirt detection.

The image reading device 1 first moves the carriage (reading position) to the reference position (step S201) and commences a blank reading operation of the document original (step S202) while moving the carriage from the reference position to the terminal position at a predetermined reference velocity (for example, a velocity corresponding to a document of A4 portrait size, see FIG. 9A) (step S203, and No at step S204).

After the blank reading is completed, if the outcome of decision at step S204 is positive, the image reading device 1 stops the reading operation (step S205), and temporarily saves the image data obtained by blank reading (step S206).

The image reading device 1 then commences the reading of one page (step S207). The carriage is moved in the process direction at a velocity determined according to the size of the document original and the image reading magnification until the reading operation of the entire page is completed (step S208, and No at step S209).

Once the reading operation of the entire page is completed, and the outcome of decision at step S209 becomes positive, the image reading device 1 checks the read image data for presence of a vertical line whose position remains unvarying in the main scanning direction (step S210). If the outcome of decision at step S210 is positive, the image reading device 1 checks whether the positions of the vertical line in the image data obtained by document reading and the vertical line in the image data obtained by blank reading are different (step S211). If the outcome of decision at step S211 is negative, that is, if the positions of the vertical line in the image data obtained by document reading and the vertical line in the image data obtained by blank reading are aligned, the image reading device 1 checks whether the lengths of the vertical line in the image data obtained by document reading and the vertical line in the image data obtained by blank reading are different (step S212).

If the outcome of decision at step S212 is positive, the image reading device 1 determines that there is presence of dirt (step S213). Also, if the outcome of decision at step S211 is positive, the image reading device 1 proceeds to process 213, and surmises that there is presence of dirt.

The image reading device 1 displays the warning on the control and display panel 33 (step S214).

If the outcome of decision at step S212 is negative and the outcome of decision at step S210 is negative, the image reading device 1 determines that there is no presence of dirt (step S215), and checks whether there is another page to be read (step S216). If the outcome of decision at step S216 is positive, the image reading device 1 returns to process 201 to perform the reading operation of the next page. If the outcome of decision at step S216 is negative, the image reading device 1 ends the reading operation.

At 4 mm/sec, the movement velocity of the reading position (carriage) (for a document of A4 portrait size) is much smaller than the conveying velocity 400 mm/sec of the document original PP (being 1% of the conveying velocity of the document original). Consequently, there is no adverse effect on the quality of the read image even if the driving period of the CCD line-image sensor 20 is not adjusted. Therefore, the adjustment of the driving period of the CCD line-image sensor 20 can be done away with.

In the embodiment described above, the present invention is implemented on an independent image reading device as shown in FIG. 1. The present invention however can equally be implemented on an image processing device equipped with a reading function such as a copier or a multifunction peripheral. Further, the size of the dirt adhering to the exposure glass 10 is not limited to the range of 0.05 mm to 0.2 mm described in the embodiment. The length of the vertical line formed due to dirt can also be suitably set according to the size range of the dirt.

According to an embodiment of the present invention, an unambiguous detection of dirt adhering to an exposure glass can be made. Consequently, the user can take appropriate measures such as cleaning the exposure glass, and as a result obtain good quality image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device that feeds a document original along a sub-scanning direction over an exposure glass, the image reading device comprising:
   a moving unit that moves back and forth in the sub-scanning direction over the exposure glass thereby causing an image reading position on the exposure glass to move;
   a line image sensor that reads one line of an image of the document original at the image reading position in a main scanning direction, while the moving unit is moving, thereby obtaining image data; and
   a dirt determining unit that determines, when a straight line appears at a constant position with respect to the main scanning direction in the image data and a length of the straight line is within a predetermined range, that there is dirt on the exposure glass.

2. The image reading device according to claim 1, wherein a movement velocity of the moving unit is set according to a size of the document original and an image reading magnification.

3. A method of controlling an image reading device that feeds a document original along a sub-scanning direction over an exposure glass, the method comprising:
   moving a moving unit back and forth in the sub-scanning direction over the exposure glass thereby causing an image reading position on the exposure glass to move;
   reading by a line image sensor one line of an image of the document original at the image reading position in a main scanning direction, while the moving unit is moving, thereby obtaining image data; and
   determining, when a straight line appears at a constant position with respect to the main scanning direction in the image data and a length of the straight line is within a predetermined range, that there is dirt on the exposure glass.

4. The method according to claim 3, further comprising setting a movement velocity of the moving unit according to a size of the document original and an image reading magnification.

* * * * *